United States Patent [19]

Sanjuan

[11] Patent Number: 4,978,838

[45] Date of Patent: Dec. 18, 1990

[54] DEVICE FOR ELECTRONIC CONTROL OF THE SUPPLY OF A HEATING RESISTANCE

[76] Inventor: Antonio B. Sanjuan, c/o Moulinex Espana S.A. Diagonal 622, Barcelona 21, Spain

[21] Appl. No.: 443,378

[22] Filed: Nov. 30, 1989

[30] Foreign Application Priority Data

Dec. 12, 1988 [FR] France .............................. 88 16331

[51] Int. Cl.$^5$ ............................................ H05B 1/02
[52] U.S. Cl. .................................. 219/497; 219/505; 219/511; 219/501; 219/492; 307/117
[58] Field of Search ............... 219/490, 492, 494, 497, 219/499, 501, 505, 506, 511; 123/179 BG, 179 H; 307/117

[56] References Cited

U.S. PATENT DOCUMENTS

| 4,516,543 | 5/1985 | Abe et.al. | 219/497 |
| 4,607,153 | 8/1986 | Ang et al. | 219/508 |
| 4,755,656 | 7/1988 | Charlesworth et al. | 219/492 |

Primary Examiner—M. H. Paschall
Attorney, Agent, or Firm—Young & Thompson

[57] ABSTRACT

Electronic control device of the electrical supply of a heating resistance (1) adapted to heat a cooking or grilling enclosure (2) such as, for example, the heating enclosure of a toaster. A detector (9) detects the temperature prevailing in the enclosure (2) and is electrically connected to an electronic timing circuit (7) adjustable according t a selected temperature (To) chosen by the user, and is adapted particularly to control the opening of a switch (5) mounted in series with the resistance (1). The detector (9) is mounted outside the enclosure (2) and comprises a variable resistance (10), for example a thermistor, which is in thermal relationship with a calibrated resistance (11), and which is electrically connectd to the timing circuit (7) so as to control this circuit. The thermal characteristics of the detector (9) are such that the timing circuit (7) controls the opening of the switch (5) practically at the instant at which the heating resistance (1) achieves the selected temperature (To).

5 Claims, 1 Drawing Sheet

FIG. 1
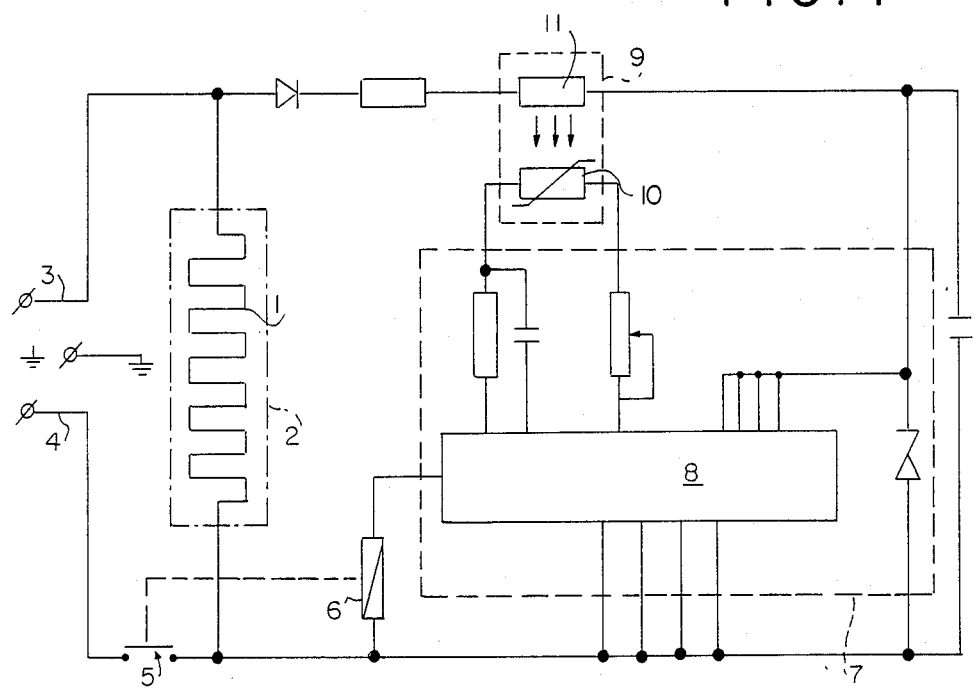
FIG. 2
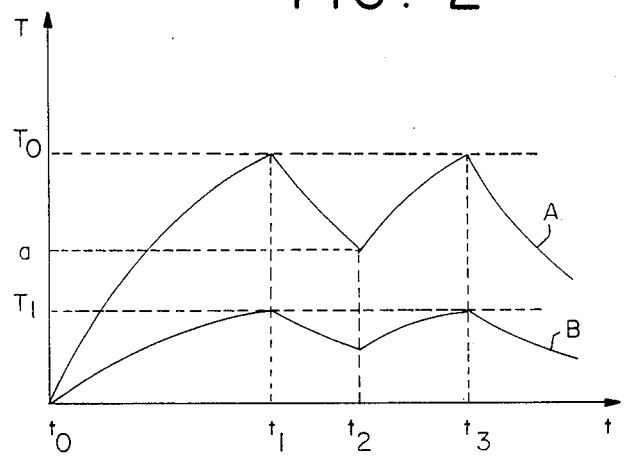
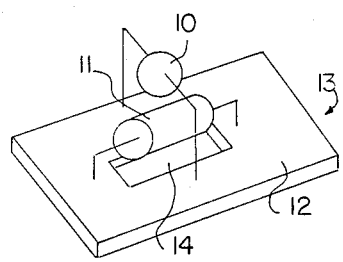
FIG. 3

DEVICE FOR ELECTRONIC CONTROL OF THE SUPPLY OF A HEATING RESISTANCE

The present invention relates to an electronic control device for the electrical supply of a heating resistance adapted to heat a cooking or grilling enclosure such as, for example, the heating enclosure of a toaster.

The invention relates more particularly to an electronic device comprising a detector adapted to determine the temperature prevailing in the enclosure, electrically connected to an electronic timing circuit adjustable according to a selected temperature chosen by the user, and adapted particularly to control the opening of a switch mounted in series with said resistance. In the known electronic control devices, the temperature detector is located in the cooking enclosure, adjacent the heating resistance. The heat in the cooking enclosure can provoke after a certain time a change in the detector resulting in faulty time periods. To overcome this disadvantage, there are used very high quality detectors, which are expensive. Despite that, there results after a longer time, a certain alteration of the functional characteristics of these detectors.

The present invention has for its object to provide an electronic control device for the electrical supply of a heating resistance, such that the temperature regulation in the enclosure will be reliable and durable. Another object of the invention is to provide an inexpensive device, easy to operate and adaptable to mass-produced apparatus.

According to the invention, the temperature detector is mounted outside the enclosure and comprises a variable resistance, for example a thermistor, which is in thermal relation to the calibrated resistance, and which is electrically connected to the timing circuit so as to control this circuit, the thermal characteristics of the detector being such that the timing circuit controls the opening of the switch practically at the instant the heating resistance achieves the selected temperature.

Thanks to the couple formed by the calibrated and variable resistances, there is recreated outside the heating enclosure a thermal model simulating the temperature conditions prevailing in this enclosure. It will be understood that such a detector is particularly interesting for controlling a toaster, because it protects the components of the detector from the severe thermal conditions prevailing in the narrow enclosure for the reception of the slices of bread. Moreover, it permits taking account of the residual heat in the cooking enclosure, during successive operations of the apparatus.

According to a preferred embodiment of the invention, the detector comprises also means for thermal regulation.

According to a particularly advantageous embodiment of the invention, the calibrated resistance being mounted on one of the surfaces of a printed circuit, and the variable resistance being situated above said calibrated resistance, the thermal regulation means of the detector is comprised by a ventilation opening provided in the board of the printed circuit, below the calibrated resistance, so as to provide an air current through said ventilation opening.

This embodiment permits adjusting the control device, by changing the thermal characteristics of the detector, which is to say by modifying the relative values not only of the calibrated resistance and of the variable resistance, but also of the size of the ventilation opening.

The characteristics and advantages of the invention will become apparent from the detailed description which follows, by way of example, with reference to the accompanying drawing, in which:

FIG. 1 shows an electrical diagram of a control device comprising a detector according to the invention;

FIG. 2 shows the temperature curves of the calibrated resistance and of the heating resistance as a function of time;

FIG. 3 shows in perspective an arrangement of the components of the detector mounted on a printed circuit.

The electronic diagram of FIG. 1 shows a control device for the electrical supply of an electrical heating resistance 1 adapted to heat a grilling enclosure 2 of a toaster (schematically shown in broken lines). The heating resistance is connected by two terminals 3 and 4 to the electrical feed circuit. The switch 5 is mounted in series with said heating resistance 1 and is adapted to be closed in the lower position of the bread corresponding to toasting the bread. The opening of this switch is controlled, for example by means of an electromagnet 6, by an electronic timing circuit 7 adjustable to a selected temperature To chosen by the user and comprising, in a manner known per se, an integrated circuit 8 enclosing a counter and an internal clock. The timing circuit 7 determines the cooking time relative to the selected temperature. A detector 9 adapted to detect the temperature is electrically connected to the timing circuit 7–8 whose clock frequency it varies so as to change the cooking time.

The detector 9 is mounted outside the toasting enclosure 2 and comprises a variable resistance 10, for example a thermistor of negative coefficient (cTN), which is in thermal relation with the calibrated resistance 11, and which is electrically connected to the timing circuit 7–8 so as to control this circuit, the thermal characteristics of the detector being such that the timing circuit effects the opening of the switch 5 practically at the instant at which the heating resistance 1 attains the selected temperature To.

Thus, thanks to the arrangement of the detector 9 outside the enclosure 2 which completely removes it from the thermal influence of the enclosure, there can be used for the variable resistance 10 and calibrated resistance 11 ordinary components which can be mass produced. The calibrated resistance 11 of the wound resistance type is connected in parallel to the heating resistance 1 and is mounted adjacent the variable resistance 10, such that the heat radiation which it emits directly influences said variable resistance 10.

Thus, referring to FIG. 2, by the relative choice of the components of the detector 9, the temperature curve B as a function of time of the calibrated resistance 11 is substantially proportional to that of the heating resistance 1, which permits using the residual heat in the enclosure that receives the bread slices, during successive uses of the apparatus.

Upon the first use of the apparatus, the toasting enclosure is cold. From the closing of the switch 5 at the time to, the heating resistance heats to a selected temperature To, while the calibrated resistance 11 attains a selected compensated temperature T1. Thanks to the information transmitted to it by the detector 9, the timing circuit 7–8 controls the electromagnet 6 which opens the switch at time t1 and thus discontinues the electrical feed of the heating and calibrated resistances which then cool simultaneously.

During a second operation of the apparatus by closing the switch 5 at time t2 (lowering the bread holder into the enclosure), the detector 9 takes account of the residual heat prevailing in this enclosure. It is necessary therefore that the calibrated resistance 11 achieve the compensated selected temperature T1 at the same time that the heating resistance attains the selected temperature To, according to the residual temperature. In the ideal case, the two temperature curves should be proportional.

To facilitate obtaining such proportionality between the curves, the detector 9 comprises also a thermal regulating means.

According to a preferred embodiment of the invention and referring to FIG. 3, the calibrated resistance 11 being mounted on one of the surfaces 12 of a board 13 of a printed circuit, and the variable resistance 10 being located above the calibrated resistance 11, the thermal regulating means of the detector 9 is comprised by a ventilation opening 14 provided in the board 13 of the printed circuit, below the calibrated resistance 11, so as to create an air current through said ventilation opening 14.

To this end, the printed circuit board 13 is mounted horizontally in a casing (not shown) of the apparatus, such that the inlet of the ventilation opening 14 situated opposite the calibrated resistance 11 remains disengaged to permit the air current through said opening.

The thermal characteristics of the detector 9 are adjusted by variation of the relative values not only of the calibrated resistance 11 and variable resistance 10, but also by the size of the ventilation opening 14.

For example, there is obtained a more rapid cooling gradient when the size of the ventilation opening 14 is increased. It therefore suffices to adapt these three values to render the thermal constant of the temperature curve B of the calibrated resistance 11 substantially proportional to that of the heating resistance 1.

What is claimed is:

1. Electronic control device of the electrical supply of a heating resistance adapted to heat a cooking or grilling enclosure, and comprising a detector adapted to detect a first temperature bearing a predetermined relationship to a second temperature prevailing in the enclosure and electrically connected to an electronic timing circuit adjustable according to a selected temperature chosen by the user, and adapted particularly to control the opening of a switch mounted in series with said resistance, the detector being mounted outside the enclosure and comprising a variable resistance which is in thermal relationship with a calibrated resistance such that heating of the variable resistance by said calibrated resistance simulates said second temperature prevailing in the enclosure, and which is electrically connected to the timing circuit so as to control said circuit, the thermal characteristics of the detector being such that the timing circuit controls the opening of a switch substantially at the instant at which the heating resistance causes said second temperature to equal said selected temperature.

2. Device according to claim 1, wherein the calibrated resistance is connected in parallel to the heating resistance and is mounted adjacent the variable resistance, such that the heat radiation which it emits influences directly said variable resistance.

3. Device according to claim 2, wherein the detector comprises also a thermal regulation means.

4. Device according to claim 3, wherein the calibrated resistance being mounted on one of the surfaces of a printed circuit board, and the variable resistance being located above said calibrated resistance, the thermal regulation means of the detector is comprised by a ventilation opening provided in the printed circuit board, below the calibrated resistance, so as to create a current of air through said ventilation opening.

5. Device according to claim 4, wherein the thermal characteristics of the detector are adjusted by variation of the relative values, not only of the calibrated resistance and of the variable resistance, but also of the size of the ventilation opening.

* * * * *

UNITED STATES PATENT AND TRADEMARK OFFICE
CERTIFICATE OF CORRECTION

PATENT NO.   : 4,978,838
DATED        : December 18, 1990
INVENTOR(S)  : Antonio BASORA SANJUAN It is certified that error appears in the above—identified patent and that said Letters Patent is hereby corrected as shown below:

On the title page, under Item 19, change the inventor's surname from "Sanjuan" to --Basora Sanjuan--.

In Item 76, change the inventor's name from "Antonio B. Sanjuan" to --Antonio Basora Sanjuan--.

Signed and Sealed this

Twenty-first Day of April, 1992

Attest:

HARRY F. MANBECK, JR.

*Attesting Officer*   *Commissioner of Patents and Trademarks*